United States Patent [19]
Johnson

[11] Patent Number: 5,335,104
[45] Date of Patent: Aug. 2, 1994

[54] METHOD OF DETECTING BREAKS IN MULTI-DROP FEEDER SYSTEMS

[75] Inventor: Robert W. Johnson, Marcy, N.Y.

[73] Assignee: Laser Precision Corp., Utica, N.Y.

[21] Appl. No.: 964,826

[22] Filed: Oct. 22, 1992

[51] Int. Cl.⁵ .................. H04B 10/08; H04J 14/02
[52] U.S. Cl. .................. 359/110; 359/124; 359/166; 359/168
[58] Field of Search ........... 359/110, 124, 125, 126, 359/155, 161, 167, 166, 173, 168

[56] References Cited

U.S. PATENT DOCUMENTS

| | | | |
|---|---|---|---|
| 4,555,810 | 11/1985 | Khoe | 359/125 |
| 4,749,248 | 6/1988 | Aberson, Jr. et al. | |
| 4,775,233 | 10/1988 | Kaneshi et al. | 356/73.1 |
| 5,078,489 | 1/1992 | Lieber | 356/73.1 |

FOREIGN PATENT DOCUMENTS 0032732 2/1989 Japan .................. 359/110

Primary Examiner—Leslie Pascal
Attorney, Agent, or Firm—Harris Beach & Wilcox

[57] ABSTRACT

A passive distribution net connects a host digital terminal to a number of optical network units which service respective subscribers. Transmit and receive feeder fibers branch out to the optical network units with optical power splitters. An out-of-band laser light is blended with the communications wavelength on the transmit feeder at the host digital terminal and is stripped at the receive feeder using wave division multiplexers. Similar wave division multiplexers at the optical network units are coupled by an optical shunt to carry the out-of-band light around each optical network unit. This arrangement monitors network integrity and can discern fiber failure from optical network unit failure.

4 Claims, 1 Drawing Sheet

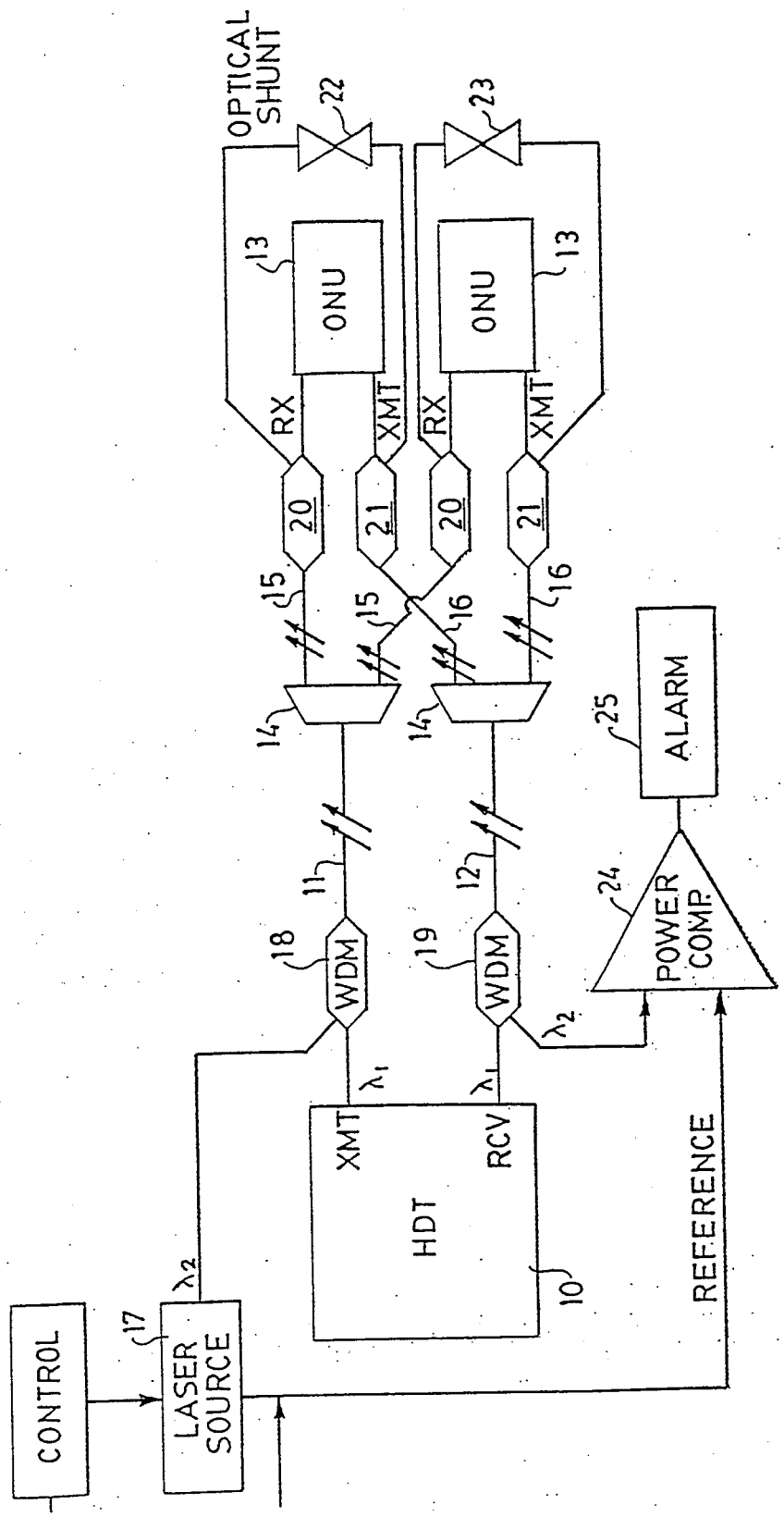

METHOD OF DETECTING BREAKS IN MULTI-DROP FEEDER SYSTEMS

BACKGROUND OF THE INVENTION

This invention relates to multiple-drop fiber optic communication systems, and is more particularly directed to a technique for detecting and locating breaks in the feeder fibers in such communication systems.

Recently, fiber-in-the-loop (FITL) architecture has been proposed, and this has been adopted by a number of communications equipment suppliers. The prevalent communications architecture is what has come to be called the Passive Distribution Network (PDN). In this scheme, a feeder fiber leaves the host digital terminal (HDT) to serve up to several hundred subscribers. Each of the subscribers is attached to an optical path by means of an associated opto-electronic interface device, which is referred to as an optical network unit (ONU). In the optical distribution net, branching to the multiplicity of ONUs is accomplished with optical power splitters in the feed net. There can be one or more stages of power splitting. There are no active components in the net between the HDT and ONUs, i.e., there are no active components to fail.

If there is a fiber break in any of the feeders between an HDT and a splitter servicing a number of ONUs, the occurrence of the break can be deduced with good statistical reliability by polling each of the ONUs and mapping their responses. If it is found that a group of ONUs does not respond, it can be assumed that the failure is in one of the feeder fibers. However, if only one individual ONU fails to respond, it is impossible to infer from polling data whether it is the fiber serving that ONU or the ONU itself that is at fault. So long as the question of fiber failure or ONU failure is unresolved, there is a strong possibility of dispatching a repair worker in error to the ONU or to the feeder. As each repair trip involves time and distance to service a remote location, the cost of erroneous dispatch can amount to hundreds of dollars per error.

OBJECTS AND SUMMARY OF THE INVENTION

It is an object of this invention to provide an effective failure detection system that can distinguish fiber failure from ONU failure, thus avoiding drawbacks of prior art schemes.

It is another object to provide a failure detection and location system that can be operated single-ended, i.e., from the HDT end of the net.

In accordance with an aspect of this invention, the passive distribution network has a host digital terminal (HDT) computer with an output terminal that outputs a light carrier in a given wavelength band and a receive terminal that receives a light carrier in that band. Each network subscriber or group of subscribers is provided with an optical network unit or ONU which receives and transmits signals carried on the light carrier in this band. Receive and transmit primary optical fiber feeders connect the HDT receive and transmit terminals to optical power splitters. Branch fibers couple the respective splitters to transmit and receive terminals of the downstream ONUs. There can be one or several stages of splitters.

The failure monitoring system of the invention comprises a laser source generating out-of-band light, e.g. at 1650 to 1700 nm where the wavelength used for communications is between 850 and 1550 nm. The out-of-band light could also be below the communication wavelength band, or in some cases between the communications wavelengths. The out-of-band wavelengths can be anywhere in the spectrum, provided there is enough separation from the communication channels to avoid interference. Respective wave division multiplexers and demultiplexers are interposed in the branch fibers and the primary fiber feeds to inject the out-of-band light to blend it with the light carrier and to strip it from the light carrier, respectively. There are respective light shunt means provided at each of the ONU's to couple the respective wave division demultiplexer and multiplexer to carry the out-of-band light around the ONU. A power comparator has a reference input coupled to the laser source to receive a reference level and another input coupled to the injection wave division demultiplexer associated with the HDT.

In the event of a system failure, there will be a proportional decrease in the amount of out-of-band light returned through the net to the detection wave division demultiplexer of the HDT. The degree of loss, i.e., the change in optical power, will indicate the number of optical levels before the break.

In a practical system, there are built-in insertion losses in the fiber net, and time variances in the laser source, and these are calibrated. To monitor the laser fluctuations, a small portion of the transmitted power of the out-of-band laser light is split off and monitored. Any received fluctuation that does not correspond to a correlated fluctuation in the transmitted laser power would then represent a perturbation in the system. If there is a corresponding transmit fluctuation, the perturbation could be disregarded.

To remove the effects of network loss, an initial power reference value is established, e.g. at the time of installation, and is maintained until replaced at the time of maintenance or further installation.

During the monitoring, if a significant change is detected in the out-of-band receive power level, the HDT equipment is commanded to poll all of its served ONUs, and these are monitored for response. From the additional data gathered by polling, a strong statistical inference can be made as to the location of the failure, and as to its nature. On the other hand, in the absence of a loss of out-of-band receive power, the occurrence of a non-responding ONU would indicate a failed ONU.

The practical limit to the sensitivity of the detection system, and the threshold of failure detection are determined by the laser source power, detector sensitivity, and maximum insertion loss of the feeder loops.

The above and many other objects, features, and advantages of this invention will become apparent from the ensuing description of a preferred exemplary embodiment, which should be read in conjunction with the accompanying Drawing.

BRIEF DESCRIPTION OF THE DRAWING

The sole Drawing Figure is a schematic of a fiber optic multidrop communications system incorporating the fault detection system of the preferred embodiment.

DETAILED DESCRIPTION OF THE PREFERRED EMBODIMENT

The sole drawing Figure illustrates a fiber network architecture which includes a broken feed fiber detection feature of one embodiment of this invention. In this system a host digital terminal (HDT) 10 sends a transmit signal on a light carrier of a wavelength $\lambda_1$ along an optical fiber feeder line 11 and receives a signal on a light carrier of the same or another wavelength via another fiber feeder line 12. Each subscriber is connected to the optical network by an opto/electronic interface device, referred to as an optical network unit or ONU 13. The HDT 10 can service three hundred or more subscribers, but to avoid drawing clutter, only two ONUs 13 appear in the drawing to represent a much larger number. The feeder lines 11, 12 branch to the ONUs by means of optical power splitters 14 in the feed network. Again, each splitter can have many branches, and there can be several levels of power splitting, but a simple arrangement of two splitters is shown here to represent a more complex practical arrangement. Here one of the splitters 14 couples the transmit feeder line 11 to branch optical fibers 15 which are coupled to receive inputs of the respective ONUs 13, and the other splitter 14 couples branch fibers 16, from respective transmit terminals of the ONUs, to the receive fiber feed line 12. The light carrier is preferably at a communications wavelength $\lambda_1$ in the infrared wavelength band, e.g. 1300 to 1550 nanometers. In other embodiments other wavelengths can be employed, provided the light carrier will propogate in the fibers but will not interfere with the communication channels.

In this invention an out-of-band laser source 17 places a light at a wavelength $\lambda_2$, removed from the communications wavelength $\lambda_1$, onto the network at the transmit side of the HDT 10, and the out-of-band wavelength $\lambda_2$ is later stripped off at the receive side of the HDT 10. The measured strength of the stripped-off out-of-band light is used to monitor network integrity. A wave division multiplexer WDM 18 is placed on the feed line 11, and is coupled to the output of the laser 17. At the receive side of the HDT, another wave division multiplexer 19 is placed on the feed line 12 to strip out the out-of-band wavelength $\lambda_2$. In order to complete the optical circuit further WDMs 20 and 21 are placed at the receive inputs and transmit outputs of the ONUs 13. An optical shunt 21, 23 at each ONU 13 brings the out-of-band light that is stripped out by the WDM 20 back to the other WMD 21, where it is reintroduced into the transmit branch fiber 16.

The laser source 17 provides a reference level to one input of a power comparator 24 and the receive-side out-of-band light which is stripped out by the WDM 19 is supplied to another input thereof. If there is a loss of the out-of-band power, and if that loss is unaccompanied by a fluctuation in the output of the laser 17, the comparator 24 triggers an alarm 25 to indicate a possible break or failure. A control circuit 25 can effect a comparison of out-of-band stripped power from WDM 19 with various power levels, and thereby ascertain the stage of the network at which a failure may have occurred.

Meanwhile, the HDT diagnoses the status of the ONUs by polling them and recording their response. Mapping of the responses, and failures to respond, of the various ONUs will identify the location of any possible fiber break.

The HDT 10 polls the ONUs also when the out-of-band light indicates good network integrity. At such times, a non-response by any of the ONUs indicates a fault within the ONU.

For this embodiment, the out-of-band laser source is chosen with a wavelength $\lambda_2$ of 1650 nm or longer to minimize crosstalk and interference with normal communications. However, wavelengths beyond about 1700 nm are undetectable for many available detectors. Fortunately, a laser source is readily available, emitting a wavelength of 1660 nm.

As used in this specification the term "out of band" also means at unused intermediate wavelengths, e.g. in a wavelength gap between transmit and receive wavelengths, so long as sufficient separation exists between communication and measuring wavelengths to permit the WDMs to be effective.

The invention is described above in detail with reference to one preferred embodiment, but the invention is not limited to that precise embodiment. Rather, many modifications and variations would present themselves to persons skilled in the art without departing from the scope and spirit of this invention as defined in the appended claims.

What is claimed is:

1. A fiber optic passive distribution network in which a host digital terminal serves a plurality of subscribers, each of said subscribers being provided with an optical network unit, said host digital terminal and each of said optical network units having a transmit terminal outputting a light carrier in a given wavelength band and receive terminal receiving a light carrier in said wavelength band, receive and transmit primary optical fibers extending from the host digital terminal receive and transmit terminals to respective first and second optical power splitters, a plurality of first branch fibers coupling the first splitter to the transmit terminals of the associated optical network units, a plurality of second branch fibers coupling the second splitter to the receive terminals of the associated optical network units; and the improvement which comprises a laser source generating out-of-band light at a wavelength out of said wavelength band; respective wave division multiplex means interposed in the first branch fibers and said second primary fibers for blending said out-of-band light with said carriers to travel on the associated primary and branch fibers; respective wave division demultiplexer means interposed in said first primary fibers and said second branch fibers for stripping said out-of-band light from said light carriers in the associated primary and branch optical fibers; respective light shunt means at each of said optical network units for coupling the associated wave division demultiplexer and multiplexer to carry said out-of-band light between said demultiplexer and said multiplexer; a light conduit carrying said out-of-band light from said laser source to the wave division multiplexer associated with said transmit primary fiber, and a power comparator having a reference input coupled to receive a reference level from said laser source and another input coupled to the wave division demultiplexer associated with said receive primary fiber.

2. Fiber optic passive distribution network according to claim 1 wherein said laser source generates said out-of-band light in a wavelength band between 1650 and 1700 nm.

3. Fiber optic passive distribution network according to claim 1 wherein said laser source generates said out-of-band light at a wavelength of substantially 1660 nm.

4. Fiber optic passive distribution network according to claim 1, said comparator means including means to measure the attenuation of the returned out-of-band light stripped by said demultiplexer, thus permitting computation of the location of a possible fiber break in said passive network.

* * * * *